(12) United States Patent
Gesquière

(10) Patent No.: US 9,085,125 B2
(45) Date of Patent: Jul. 21, 2015

(54) LATEX BASED COMPOSITE FOAMS

(75) Inventor: Vincent Gesquière, Wevelgem (BE)

(73) Assignee: Latexco NV, Tielt (BE)

( * ) Notice: Subject to any disclaimer, the term of this patent is extended or adjusted under 35 U.S.C. 154(b) by 0 days.

(21) Appl. No.: 11/917,728

(22) PCT Filed: Jun. 29, 2006

(86) PCT No.: PCT/EP2006/006336
§ 371 (c)(1),
(2), (4) Date: Jun. 6, 2008

(87) PCT Pub. No.: WO2007/003348
PCT Pub. Date: Jan. 11, 2007

(65) Prior Publication Data
US 2008/0313815 A1    Dec. 25, 2008

(30) Foreign Application Priority Data

Jul. 1, 2005    (EP) .................................... 05106031

(51) Int. Cl.
| | | |
|---|---|---|
| *B32B 3/26* | (2006.01) | |
| *B32B 27/40* | (2006.01) | |
| *B32B 3/30* | (2006.01) | |
| *A47C 27/14* | (2006.01) | |
| *A47C 27/15* | (2006.01) | |
| *B32B 5/18* | (2006.01) | |

(Continued)

(52) U.S. Cl.
CPC ............... *B32B 27/40* (2013.01); *A47C 27/148* (2013.01); *A47C 27/15* (2013.01); *B32B 3/266* (2013.01); *B32B 3/30* (2013.01); *B32B 5/18* (2013.01); *B32B 5/32* (2013.01); *B32B 2250/02* (2013.01); *B32B 2250/22* (2013.01); *B32B 2266/025* (2013.01); *B32B 2266/0207* (2013.01); *B32B 2266/0214* (2013.01); *B32B 2266/0264* (2013.01); *B32B 2266/0278* (2013.01); *B32B 2266/06* (2013.01); *B32B 2307/554* (2013.01); *B32B 2479/00* (2013.01); *B32B 2605/08* (2013.01); *B32B 2605/18* (2013.01); *C08L 21/02* (2013.01); *Y10T 428/24355* (2015.01); *Y10T 428/24496* (2015.01)

(58) Field of Classification Search
USPC ........ 428/316.6, 158, 141; 5/736, 740, 655.9, 5/953
See application file for complete search history.

(56) References Cited

U.S. PATENT DOCUMENTS

| | | |
|---|---|---|
| 3,243,491 A | 3/1966 | Bethe |
| 3,320,339 A | 5/1967 | Smith |

(Continued)

FOREIGN PATENT DOCUMENTS

| | | | |
|---|---|---|---|
| DE | 2649861 A | * | 5/1977 |
| EP | 1444925 A1 | * | 8/2004 |

(Continued)

OTHER PUBLICATIONS

Translation of FR 2329430, Frank Duane Rice, Jul. 1, 1977. This is an equivalent document of DE 2649861.*

*Primary Examiner* — Hai Vo
(74) *Attorney, Agent, or Firm* — Fish & Richardson P.C.

(57) ABSTRACT

A composite foam comprising a top layer of latex foam and a second layer of a foam selected from polyolefin, polyurethane, polystyrene or polyester or visco-elastic latex or mixtures thereof. A bedding such as a mattress or topper comprising said composite foam.

9 Claims, 8 Drawing Sheets

Top view of composite foam with perforations, profiles and flat not convoluted second layer

(51) Int. Cl.
   *B32B 5/32* (2006.01)
   *C08L 21/02* (2006.01)

(56) References Cited

U.S. PATENT DOCUMENTS

| | | | | |
|---|---|---|---|---|
| 3,341,640 | A * | 9/1967 | Rosencrantz | 264/46.4 |
| 3,607,601 | A * | 9/1971 | Milam et al. | 428/316.6 |
| 4,186,230 | A * | 1/1980 | Sinclair et al. | 428/95 |
| 4,207,636 | A | 6/1980 | Ceriani | |
| 4,279,953 | A * | 7/1981 | Barden et al. | 428/90 |
| 4,524,473 | A * | 6/1985 | Fanti | 5/740 |
| 4,700,447 | A * | 10/1987 | Spann | 29/418 |
| 4,777,186 | A | 10/1988 | Stang et al. | |
| 5,022,111 | A * | 6/1991 | Fenner, Sr. | 5/736 |
| 5,668,378 | A | 9/1997 | Treboux et al. | |
| 5,804,113 | A | 9/1998 | Blackwell et al. | |
| 6,063,309 | A | 5/2000 | Hager et al. | |
| 6,256,821 | B1 * | 7/2001 | Boyd | 5/722 |
| 6,271,276 | B1 * | 8/2001 | Gribble et al. | 521/133 |
| 6,372,812 | B1 | 4/2002 | Niederoest et al. | |
| 6,658,683 | B2 * | 12/2003 | Parvin | 5/727 |
| 6,662,393 | B2 * | 12/2003 | Boyd | 5/727 |
| 6,782,575 | B1 * | 8/2004 | Robinson | 5/740 |
| 7,240,386 | B1 * | 7/2007 | McKay et al. | 5/724 |
| 2003/0035942 | A1 * | 2/2003 | Mertl et al. | 428/316.6 |
| 2004/0148706 | A1 * | 8/2004 | Visser et al. | 5/720 |
| 2005/0005363 | A1 * | 1/2005 | Giori et al. | 5/709 |
| 2007/0244209 | A1 * | 10/2007 | Strandburg et al. | 521/142 |
| 2009/0176076 | A1 * | 7/2009 | Ghesquire et al. | 428/215 |

FOREIGN PATENT DOCUMENTS

| | | |
|---|---|---|
| WO | 93/09934 | 5/1993 |
| WO | 01/68358 | 9/2001 |

* cited by examiner

Fig 1 Maximal perforation diameter 0.5 mm, distance interspace perforations 1.2 cm
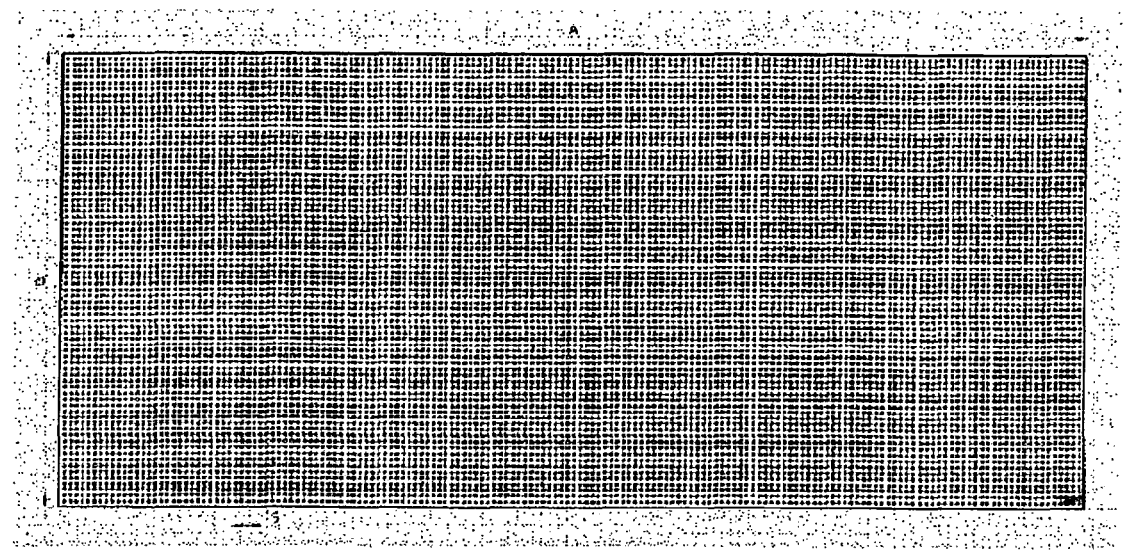
Fig 2 Composite foam with straight profiles
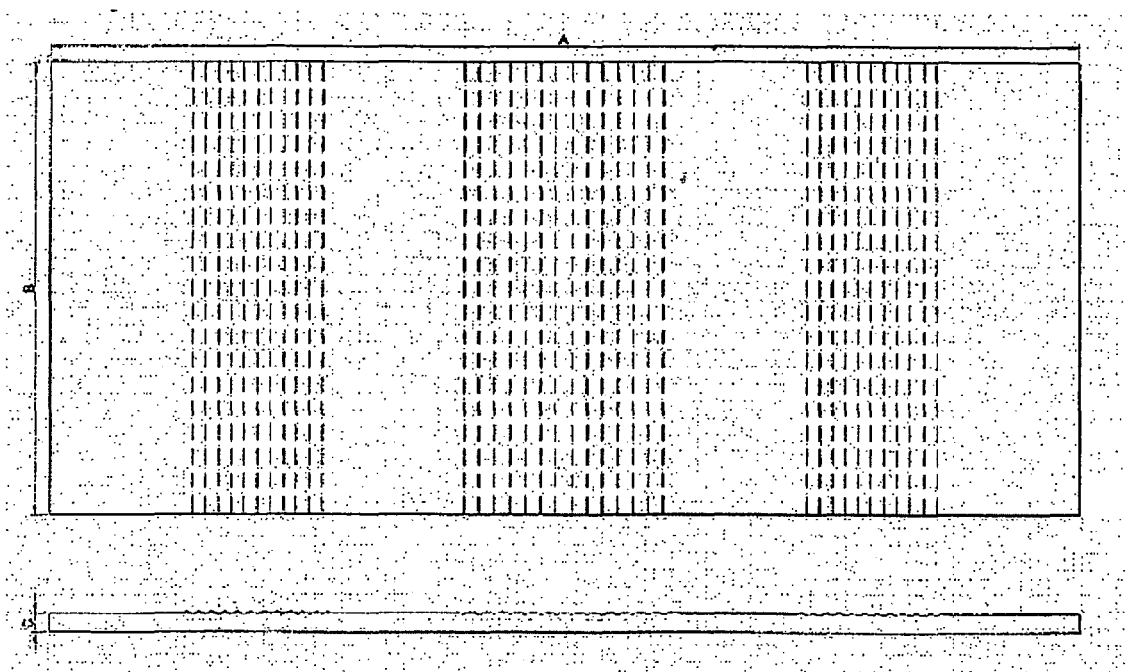

Fig 3 Composite foam with perforations and profile
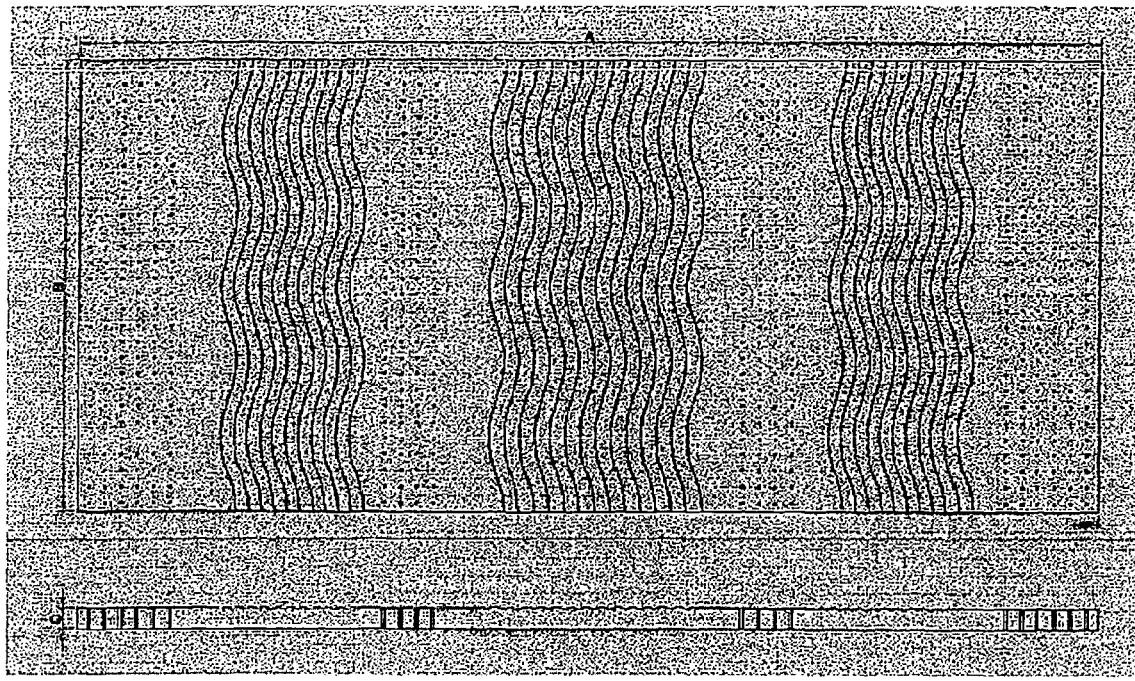
Fig 4 Composite foam with different perforations divided up in 5 zones
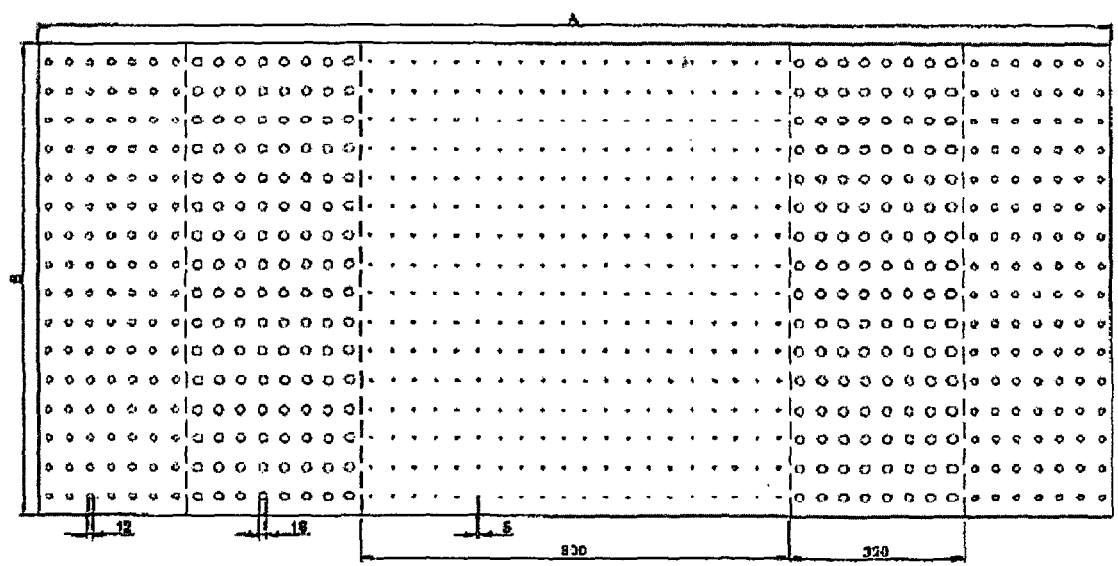

Fig 5 Composite foam with different perforations
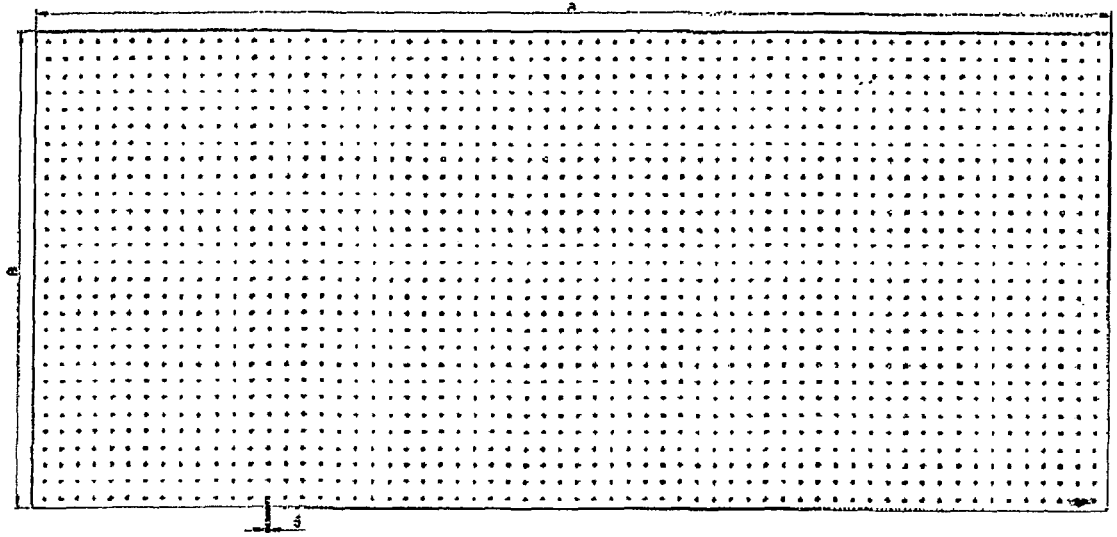
Fig 6 Composite foam with different perforations divided up in 7 zones
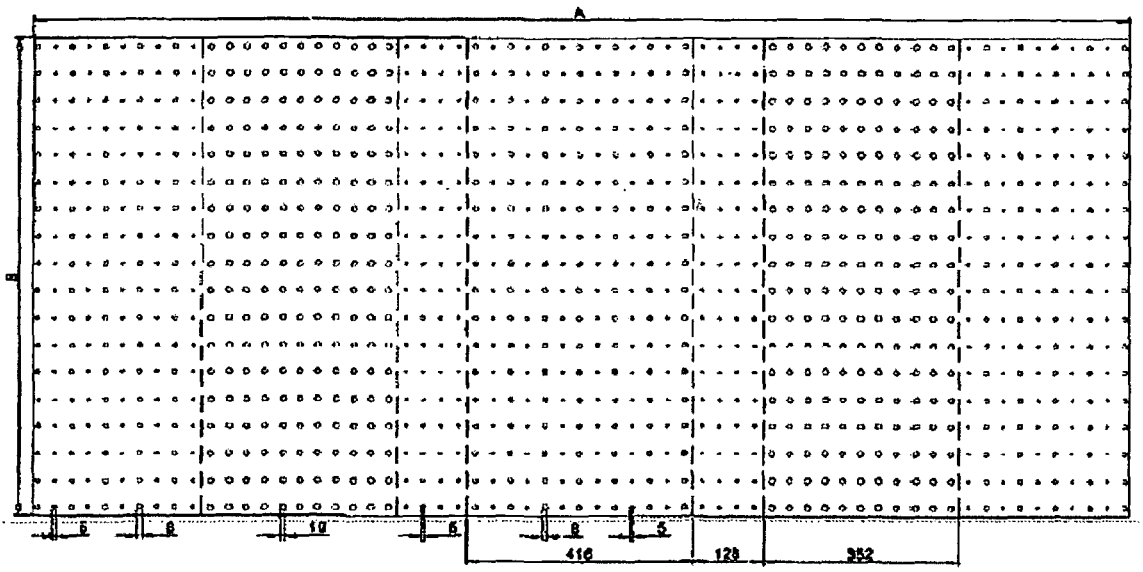

Fig 7 Composite foam with perforations, profiles and convoluted second layer
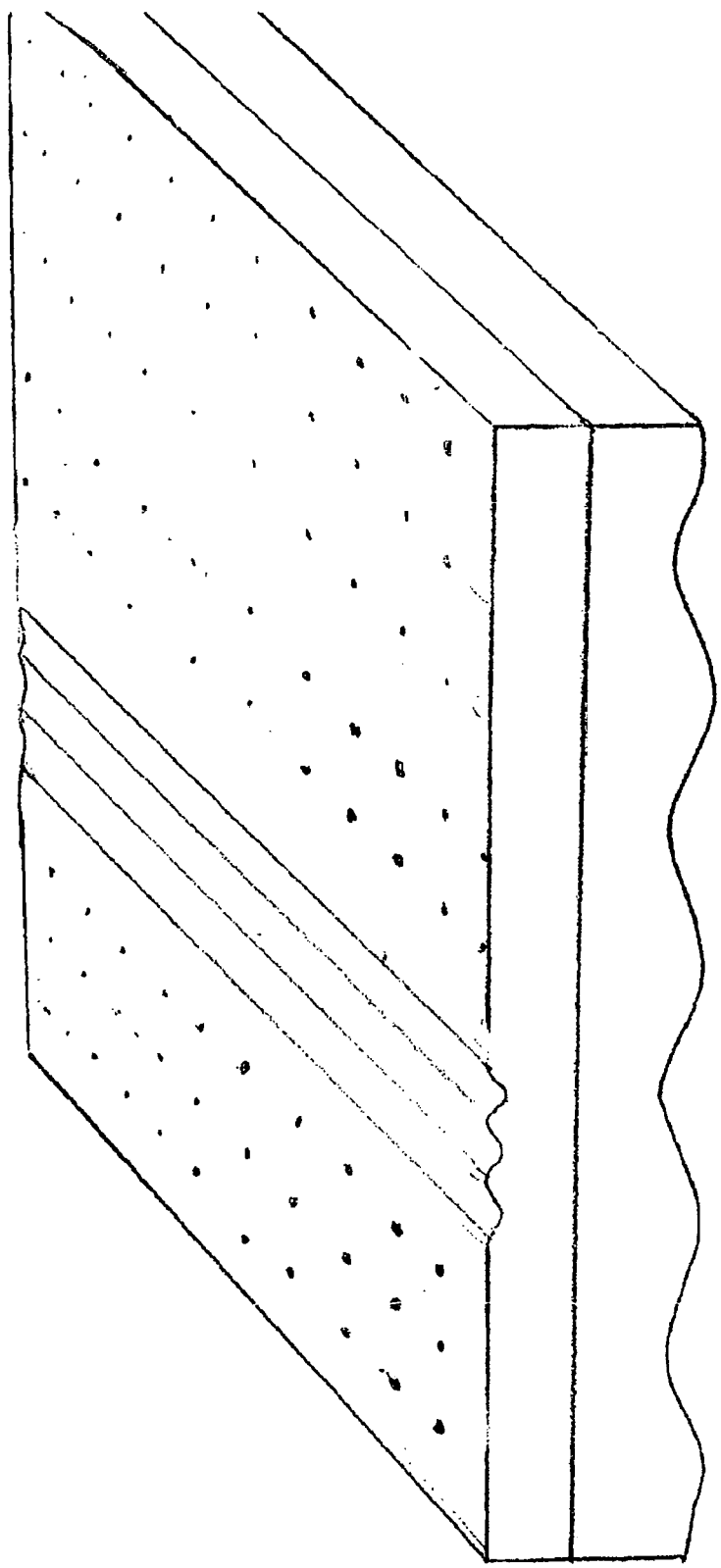

Fig 8 Composite foam with perforations and profiles
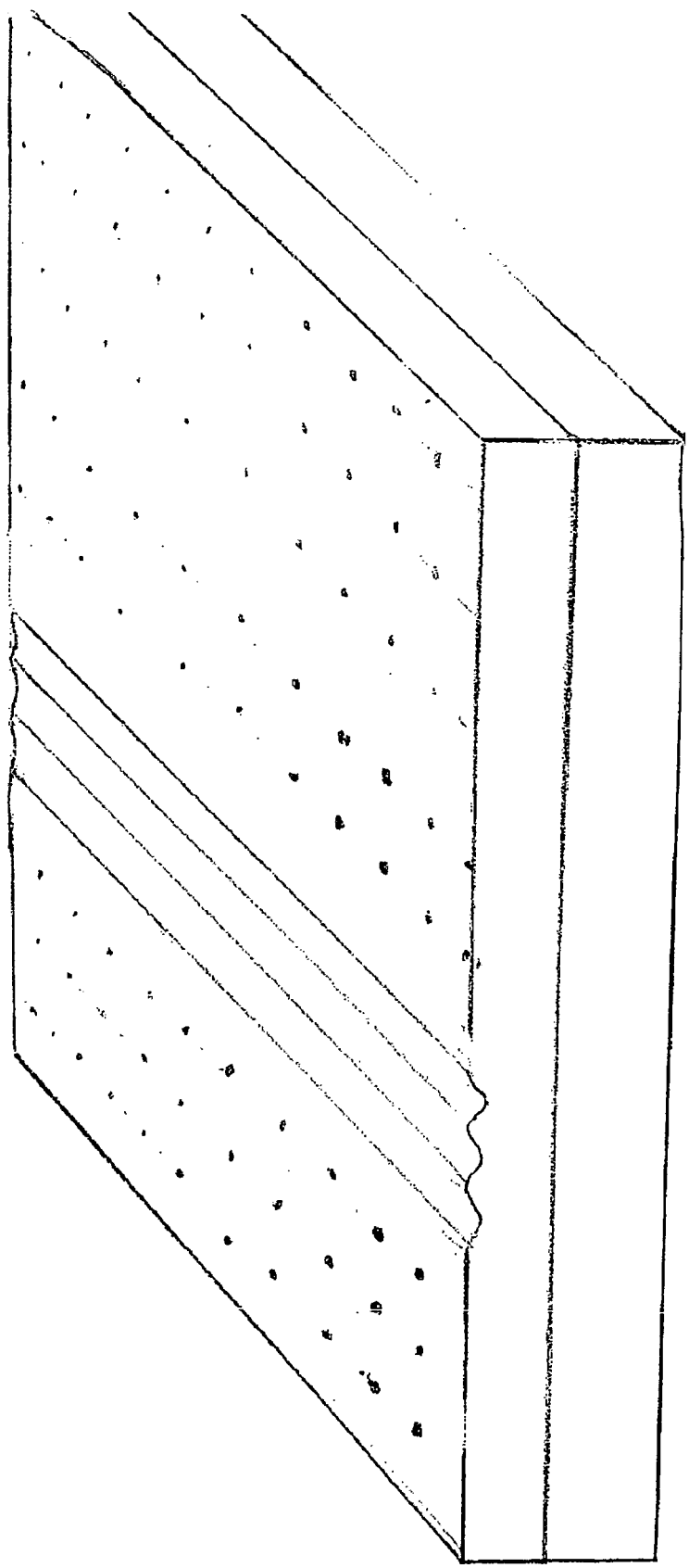

Fig 9 Top view of composite foam with perforations, profiles and convoluted second layer
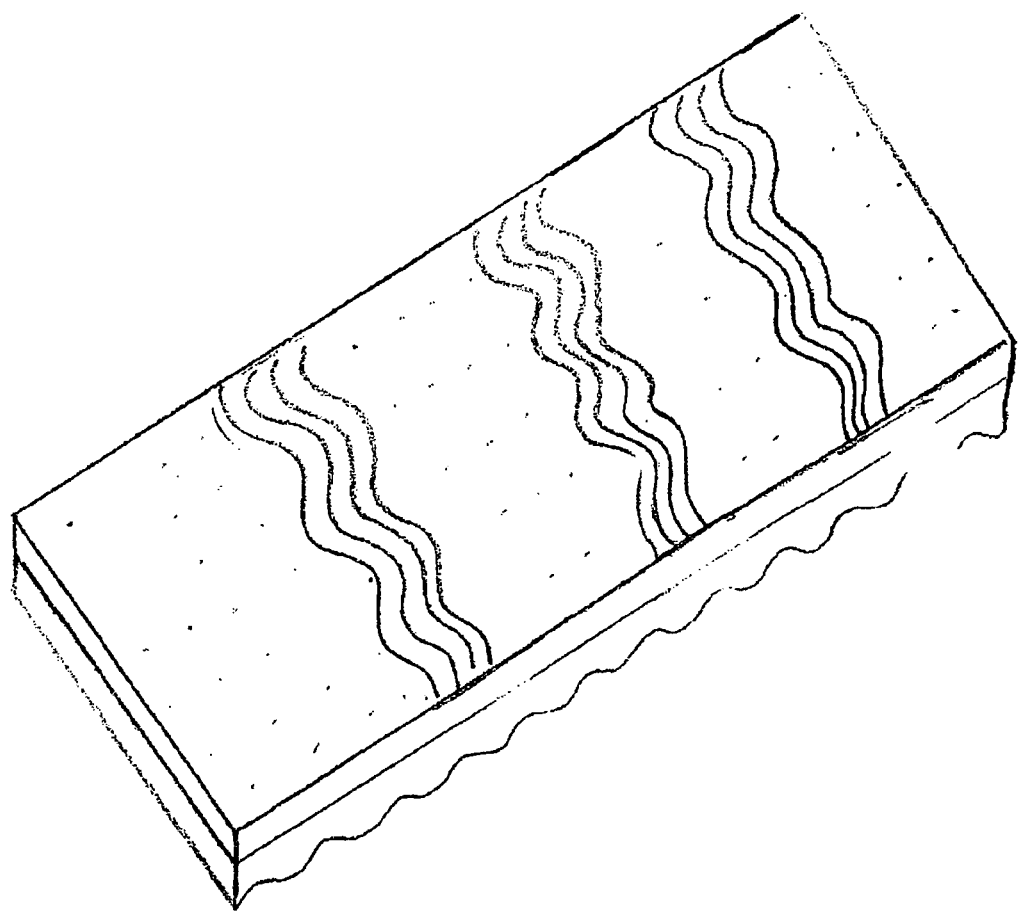

Fig 10 Top view of composite foam with perforations, profiles and flat not convoluted second layer
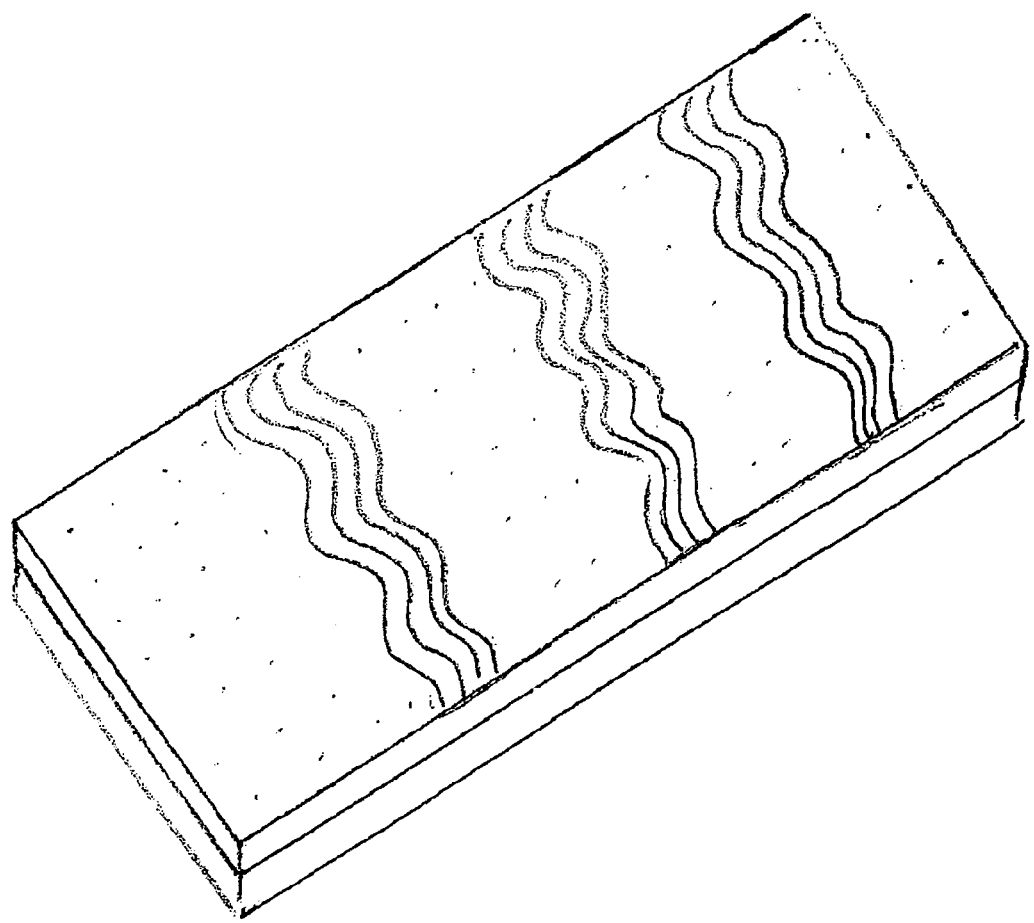
Fig 11 Latex foam on planar side of convoluted foam
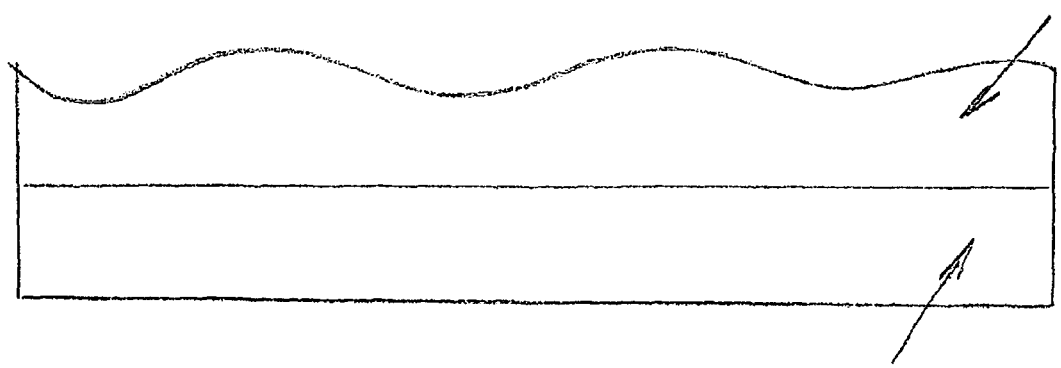

Fig 12 Latex foam on convoluted side of convoluted foam
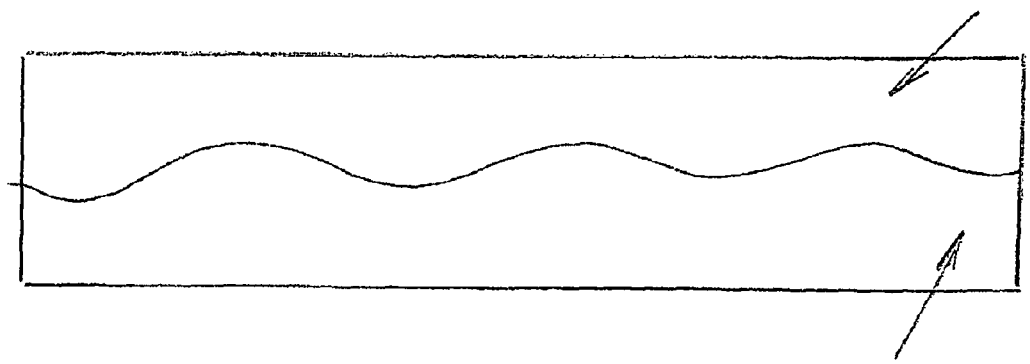

LATEX BASED COMPOSITE FOAMS

CROSS REFERENCE TO PRIOR APPLICATIONS

This application is the U.S. national phase of International Application No. PCT/EP2006/006336, filed Jun. 29, 2006, which claims priority from European Patent Application No. 05106031.7, filed Jul. 1, 2005, the disclosure of both are incorporated herein by reference in their entirety. The International Application was published in English on Jan. 11, 2007 as WO 2007/003348 under PCT Article 21(2).

TECHNICAL FIELD

The present invention relates to latex based composite foams, more in particular, the present invention relates to foams for use in a bedding or seating product, in which the foam has a first layer, which includes latex, and a second layer, which is a foam selected from polyolefin, polyurethane, polystyrene or polyester or visco-elastic latex or mixtures thereof.

BACKGROUND OF THE INVENTION

Latex foam in bedding such as mattresses has been used and is desirable because latex foam is durable and provides a high level of comfort and support. Some foams use latex foam rubber throughout the mattress. These designs are comfortable and durable, however, they are expensive.

Other materials and manufacturing techniques are also employed to improve the comfort and durability of beddings such as mattresses. For example, U.S. Pat. No. 3,320,339 to Smith discloses a mattress formed of a core of relatively low-density latex material surrounded by an integrally-molded border of higher-density latex. To manufacture this mattress, the two materials are poured into two areas of a mold (a center area and the surrounding border), which are separated by a barrier strip. During the vulcanization process, the barrier strip dissolves, and the core and border fuse together. This is an effective design however with this method, the core and border must be formed simultaneously, which may not always be desirable when, for example, the different sections would be optimally vulcanized at different temperatures and/or for different lengths of time. Also, because the mattress is composed entirely of latex foam rubber, it is relatively expensive.

For getting a more comfortable structure, these mattresses hold in addition a lot of material layers such as layers made of latex foam, polyurethane foam and all these parts are covered with wool, cotton, or other stuffings and then they are closed in a fabric envelope or sack. The connection of foam layers is obtained using a mechanical process, such as application of metallic stitches or by glueing; these operations are expensive as they require a rather long and tedious manual work and that must be made mainly by skilled workers. The glueing operation can also reduce the mattress duration as, during the use, the glue tends to loose its adhesive capacity; further, the manual glueing operation can be made in incorrect manner or the glue cannot be applied in uniform way on the pieces belonging to the same production lot or also to the same piece.

Further, mattress deformation can be caused also by lying layers, that is to say the superior and lower rest layer, during its use, tend to slide as plates onto the spring structure, as they are joined with another only by the perimetrical layers of molded material that surrounds the envelope, these layers having a reduced mass and therefore are insufficient to lock in stable position the rest layers. In this manner the mattress, both owing to deformations and wear, is no more efficient and comfortable and can be used only for a limited time period ('stability').

Toppers for use in bedding or seating products are known. These toppers extend across the entire width and length of the particular bedding or seating product. If the particular bedding or seating product is a mattress, typically one such topper is placed on one side of the mattress core, and a second topper is placed on the opposite side of the mattress core, thereby effectively "sandwiching" the mattress core. This combination then typically is covered with an upholstered fabric covering.

Toppers have been designed so as to provide multiple degrees of stiffness or firmness. In particular, in a bedding structure, which includes an innerspring mattress and a topper, the topper includes a sheet of a foam which is glued. While the glue results in added thickness to the topping. This additional thickness provides a stiffness which may prove uncomfortable to a user and which does not adapt itself to the supporting structure for the topper or mattress ('adaptability').

In addition, the glue hinders the quilting operation.

Accordingly, there remains a need for foam, which is relatively easy and inexpensive to manufacture, and which does not need to be formed simultaneously and which need not be comprised of the same material, said bedding addressing the above mentioned drawbacks.

The above-mentioned drawbacks and limitations have been overcome by composite foam for use in a bedding or seating product, in which the bedding has a first layer, which includes latex, and a second layer, which is a foam selected from polyolefin, polyurethane, polystyrene or polyester or mixtures thereof.

With the selected application of latex to said foam, single composite foam may be achieved without the need for the foam being glued or otherwise attached to one another while maintaining a high level of comfort, durability, adaptability stability and quiltability.

It is a further object of the invention to provide a thin composite mattress of the type to be used as a topper for a conventional mattress. More specifically, it is an object of the invention to provide a topper on the order of 0.1 to 10 cm thick that has the area of a conventional mattress. This topper mattress is placed over a conventional mattress and is used to provide the comfort of latex foam without the expensive of replacing the conventional mattress providing the benefits as stated hereinabove.

The topper of the present invention is for use on top of an existing conventional mattress, to increase the comfort of the mattress while utilizing an existing conventional mattress. The topper can be used as an after market product and placed on top of a mattress. Alternatively, the topper can be placed on an unfinished mattress (either a conventional mattress including steel springs or a foam mattress) and the topper and the mattress is then covered with fabric.

These and other preferred aspects of the invention are described in more detail below and will be better appreciated from the detailed description including the FIGS. 1-12.

According to another embodiment of the present invention, the invention is directed to a continuous method of making composite foam including the step of: applying latex to foam selected from polyolefin, polyurethane, polystyrene or polyester or visco-elastic latex or mixtures thereof; curing the latex, thereby forming the composite foam of the present invention.

DETAILED DESCRIPTION OF THE INVENTION

The present invention is directed to a composite foam and its use as bedding such as a mattress or topper said composite foam comprising:

A top layer of latex foam and a second layer of a foam. selected from polyolefin, polyurethane, polystyrene or polyester or visco-elastic latex or mixtures thereof.

The present invention is directed to composite foam and its use as bedding such as a mattress or topper said composite foam comprising:

A top layer of latex foam having a thickness of about 0.5 to 6 cm and a second layer of a foam selected from polyolefin, polyurethane, polystyrene or polyester or mixtures thereof, having a thickness of about 0.5 to 9.5 cm.

Latex Foam:

"Latex" is herein defined as a dispersion of polymeric particles in a continuous phase, the polymeric particles preferably having a size range of from 10 to 1000 nm. The latex foam material can be prepared from natural rubber latex or from one or more of such synthetic latexes as polybutadiene/styrene latex, polybutadiene/acrylonitrile latex, polychloroprene latex and the like or from a mixture of natural rubber latex and one or more such synthetic latexes. The later foam includes conventional latex foam as well as visco-elastic latex foam.

The solids content of suitable aqueous latexes is from 20 to 75% by weight. Preferred latexes have a solid content of from 50 to 75% by weight.

Suitable polymer latexes are all dispersions in which the solid is dispersed in a liquid phase and this phase in turn forms an emulsion with a further liquid phase. Examples are latexes of polymers consisting of dienes or olefinically unsaturated monomers and copolymers thereof, such as polystyrene-butadiene latex, polybutadiene latex, polyisoprene latex, natural rubber latex, acrylonitrile-butadiene latex, polychloroprene latex, polydichlorbutadiene latex, latex of a copolymer of chloroprene and dichlorobutadiene, polyisoprene latex, latex of chlorinated polyisoprene or (meth)acrylate latex. Dispersions of polyurethanes or other dispersions in which polymers are dispersed in water with the aid of emulsifiers or dispersing agents are also suitable, however.

Preferred latexes include latexes of natural rubber, styrene-butadiene rubber (SBR), SBR having low styrene content (up to 27%), nitrile rubber (NBR), isoprene rubber, neoprene rubber, polybutadiene rubber, isobutylene-isoprene rubber (IIR), copolymers of acrylonitrile, methacrylonitrile, acrylates, methacrylates, vinylpyridine with butadiene or 2-chloro-1,3-butadiene and chlorinated polyethylene or mixtures of any of these.

Highly preferred are latexes of natural rubber, styrene-butadiene rubber, nitrile rubber, polybutadiene rubber, isoprene rubber or copolymers comprising acrylates.

Polymer-containing latexes, such as e.g. SBR (styrene-butadiene rubber) or NBR (acrylonitrile-butadiene rubber), polychloroprene, polybutadiene, polyisoprene, natural rubber latex, polyvinyl chloride, (meth)acrylate dispersions or dispersions of copolymers thereof, are conventionally available commercially in solids concentrations of more than 50%. These concentrations can be achieved e.g. by increasing the concentration of low-concentration polymer latexes. The concentration of natural rubber latex is increased from 30% to 60% solids, for example Other preferred latexes are combinations of synthetic and natural latex. Preferred proportions of natural latex to synthetic latex can be varied from 1:4 to 6:4. Highly preferred proportions of natural to synthetic latex are more than 1:1

The proportions should be optimized according to the latex used.

Methods of obtaining latex foam can be those where latex being poured into a closed mould provided with aluminium pins to ensure good heat conduction, and subsequently being vulcanised, washed and dried into an end product. As a result of the presence of the aluminium pins in the closed mould, the mattress (the end product) comprises vertical, continuous recesses that ensure a proper ventilation of the mattress. According to this method, mattresses having a thickness of up to 20 cm can be produced, with the thickness mainly being limited by the speed at which the heat can be introduced into the core of the latex material. An alternative method for producing latex foam is the pouring of latex foam on an endless conveyor belt, followed by vulcanisation, washing and finally drying. The maximum height of the mattress built up of latex foam is approximately 6 cm, because heat cannot be introduced into the core of the latex material sufficiently quickly due to the absence of aluminium pins on the conveyor belt. Thus, owing to the absence of the aluminium pins on the conveyor belt, the latex plate that is obtained does not have any vertical, continuous channels.

Second Layer

The second layer of the composite foam is a foam selected from polyolefin, polyurethane, polystyrene or polyester or visco-elastic latex or mixtures thereof. The foam can be visco-elastic foam.

The foam offers a firm yet resilient support. Preferred foams are those having a lower indentation load deflection value than the latex foam.

The foam can comprise any natural or synthetic foam, both slab and molded. The foams are open cell. The foam may also comprise recycled foam, foam impregnated fiber mats or micro-cellular elastomer foam. Additionally, the foam may include organic and/or inorganic fillers. Furthermore, additional additives may be incorporated into the foam composition, such as, but not limited to, flame retardants, anti-fogging agents, ultraviolet absorbers, thermal stabilizers, pigments, colorants, odor control agents, perfumes and the like.

Preferred foams are polyurethane foam. Polyurethane foams with varying density and hardness may be formed. Tensile strength, tear strength, compression set, air permeability, fatigue resistance, support factor, and cell size distribution may also be varied, as can many other properties. Specific foam characteristics depend upon the selection of the starting materials, the foaming process and conditions, and sometimes on the subsequent processing.

Cellular polyurethane structures typically are prepared by generating a gas during polymerization of a liquid reaction mixture comprised of polyester or polyether polyol, an isocyanate, a surfactant, catalyst and one or more blowing agents. The gas causes foaming of the reaction mixture to form the cellular structure. The surfactant stabilizes the structure.

Once the foam-forming ingredients are mixed together, it is known that the foam may be formed under either elevated or reduced controlled pressure conditions. PCT Published Patent Application WO 93/09934 discloses methods for continuously producing slabs of urethane polymers under controlled pressure conditions. The foam-forming mixture of polyol, isocyanate, blowing agent and other additives is introduced continuously onto a moving conveyor in an enclosure with two sub-chambers. The foaming takes place at controlled pressure. Reaction gases are exhausted from the enclosure as necessary to maintain the desired operating pressure.

The two sub-chambers, a saw, and airtight doors are operated in a manner that allows for continuous production of slabstock polyurethane foam.

U.S. Pat. No. 5,804,113 to Blackwell, et al., shows a method and apparatus for continuously producing slabstock polyurethane foam under controlled pressure conditions in which a layer of gas surrounds the reaction mixture during free rise expansion of the reaction mixture to prevent pressure fluctuations. Blackwell generally describes foam reaction mixtures that may include a variety of polyols and isocyanates, and does not express preference for any specific combinations.

U.S. Pat. No. 4,777,186 to Stang, et al., describes a method of foaming in a pressurized chamber held above atmospheric pressure (i.e., in the range of about 0.5 to 1000 psig). In addition to the gases emitted during foaming, additional gases may be introduced into the chamber to maintain the elevated pressure during foaming. The resulting foams have a higher IFD to density ratio than those previously known in the art. Flexible polyurethane foams with high densities in the range of 35 to 70 kg/m<3> (or 2.2 to 4.4 lb/ft<3>) are produced by the method disclosed in U.S. Pat. No. 5,194,453 to Jourquin, et al. Polyether polyols with molecular weights in the range of 1400 to 1800 and having primary hydroxyl group content over 50% are reacted with organic isocyanates that may be TDI, MDI or mixtures of TDI with MDI. The foams may be produced by frothing the reaction mixture, or alternatively, under vacuum conditions. Support factor was not reported, although deformation tests were conducted and the foams are indicated to have improved comfort properties.

Higher density polyurethane foams (30 kg/m<3> or about 1.9 lb/ft<3>) are produced with the polyol combinations disclosed in U.S. Pat. No. 5,668,378 to Treboux, et al. The foam-forming mixture includes 80 to 99.8 percent by weight of a high functionality polyol or polyol blend with 8 to 25 percent EO, functionality from 3.2 to 6.0 and an equivalent weight of 1,000 to 4,000, a minor portion of a graft polyol, and an organic isocyanate that preferably is a mixture of TDI. The foams are foamed at atmospheric pressure.

U.S. Pat. No. 6,063,309 to Hager et al. discloses liquid-liquid polyol dispersions with an ethylene oxide (EO) content of 40 to 85 percent by weight. The polyols have functionality greater than 2. The dispersion can be used to prepare hyper-soft polyurethane foams.

High resiliency (HR) foams have been made commercially, but typically with ball rebound less than 60. For example, U.S. Pat. No. 6,372,812 to Niederoest et al. teaches the use of vacuum chamber pressure and MDI to obtain low density, high support foams. The Niederoest patent focuses on making foams with a density of 1.4 to 1.8 pounds per cubic foot. While the support factor was high, the ball rebound was 51, significantly below that of latex (generally above about 65).

Latex foam inherently provides a greater independent support characteristic relative to foams such as polyurethane or urethane foams. This difference is attributable to the compositional differences between the materials and is reflected, at least in part, in the typical load deflection curves for each type of material. A load-deflection curve is typically a graph of the force in lbs. required to indent a flat disk of 50 sq. in. (8" diameter) into the foam or other material being tested for any given percentage of deflection.

Latex foam is typically characterized by having a more gradual slope in the lower portion of the curve, that is in the range of 5-10% deflection, which typically becomes steeper in the higher portion of the curve, that in the range of 50-70% of deflection. Polyurethane foams, on the other hand, typically have a steeper initial portion of the curve, in the range of 5-10% deflection, which typically decreases in the higher deflection ranges.

Thus, while latex foam has a softer initial feel, it resists deflection at heavier loads. This contributes, at least in part to the latex foam offering greater independent support relative to urethane foam. Accordingly, it is desirable that the latex foam have a load deflection curve which has a more gradual slope in the 5-10% deflection range than the foams used in the second layer of the composite foam of the present invention.

Preferred composite foams according to the present invention contain perforations. The composite foam or the present invention allows perfect perforations. Preferably said perforations are formed in the mattress in a pattern of rows of perforations and/or columns of perforations, the spacing between two adjacent rows of perforations and/or columns of perforations. Preferably the interface between the spacing of the perforations are less than 40, more preferably less 20 mm, most preferably ranging between 10 and 15 mm.

Combinations of perforations having different sizes can also be used. Sizes of the perforations are between 0.5 and 2 cm. The perforations when combined with the composite foam of the present invention gives the user of the composite foam a higher degree of comfort. Preferred composite foams according to the present invention are characterized in that the first and second layer of foam are provided with perforations in at least one zone of the upper surface thereof and with a profile in at least one zone of said upper surface.

Preferably, the aforesaid perforations are formed in zones near those parts of a user's body that secrete the most sweat, mainly the neck, the back and the thighs.

The advantage of this is that the body moisture can be discharge directly via the aforesaid perforations, which is achieved in part as a result of the changes in the user's position, which produces movements of air through the perforations, thus effecting a natural ventilation of the upper mattress. The perforations thus prevent moisture remaining accumulated within the mattress too long, which might lead to fungoid growth and further unpleasant effects.

Preferred composite foams according to the present invention contain profiles.

The profiles when combined with the composite foams of the present invention present in specific zones at the upper side of the upper layer of composite foam enhance the sleeping comfort of the user, because the bedding when formulated with the composite foam of the present invention feels softer in said zones, depending on the shape and the dimensions of said profiles.

A suitable selection of the zones comprising perforations alternating with zones comprising profiles will lead to an upper mattress or topper, which meets each and every requirement of an exacting user as regards sleeping comfort.

According to yet another embodiment of the present invention, there is provided a composite foam including a convoluted top or convoluted second layer, which enhances user comfort.

In accordance with a further preferred aspect of the composite foam according to the present invention there is provided convoluted composite foam, which increases comfort or softness. The elongated convoluted composite foam in case of use for bedding, supports a recumbent human body. The bedding comprises an elongated body including an area formed by generally longitudinally extending ribs arranged in rows. Each rib is separated from any adjacent rib by a channel. Each rib includes a plurality of first peaks having a first height and a plurality of second peaks having a second height, different from the first height. The first and second peaks are alternatively disposed along each rib. Preferred feature of the composite foam according to the present invention that each rib is generally sinusoidal about a longitudinal axis to define sinusoidal channels there between. The first peaks are formed at crests of the sinusoidal ribs. The second peaks are formed at the longitudinal axis of each rib. The ribs are wider in areas proximate the first and second peaks. The first and second peaks are rounded. Another preferred feature of the composite foam according to the present invention is that the first height is greater than the second height. It is a further preferred feature of the invention that the channels have a first thickness in areas proximate the first peaks and a second thickness in areas proximate the second peaks. The second thickness is greater than the first thickness.

According to another embodiment of the invention, the composite foam of the present invention is made as a topper for a conventional mattress, which rests upon a conventional box spring.

The composite foam, which is used as a topper, is made in a similar fashion to a mattress. However, it is possible to manufacture a block of a relatively large thickness and then slice the block to form a plurality of mattress toppers, such as mattress topper. Mattress topper has a thickness that is between about 0.1 cm and 10 cm, and most preferably between about 0.5 cm and about 5 cm.

The topper is laid on top of the top surface of conventional mattress and is held in position by the friction between the mattress and the top of conventional mattress. In addition, a mattress pad, typically made of quilted cotton material can be placed over the mattress topper, and the mattress cover typically has prefabricated corners that are thick enough to hold both mattress topper and mattress together as a unit. Alternatively, the topper is placed on a mattress that can be either conventional mattress with steel springs, a foam mattress (either latex foam, urethane foam or other polymeric foams) or another type of mattress. The topper and the mattress are held together by a fabric cover that is sewn around the exterior of the mattress, as is the case with most conventional bedding mattresses.

The composite foam may also comprise further layers in addition to the top layer and second layer. Such a layer may be the bottom layer made of latex foam. Alternatively, different layers may be added which are alternating layers existing of latex foam and foam selected from polyolefin, polyurethane, polystyrene or polyester or visco-elastic latex or mixtures thereof.

EXAMPLE

The base layer of the composite foam consists of commercially available foam selected from polyolefin, polyurethane, polystyrene or polyester or visco-elastic latex or mixtures thereof. A specific example, Dumofoam® 16/25 by Dumo, polyurethane-based open cell foam, supplied in sheets or rolls, with either plane or profiled surface. This base layer is rolled out or placed on the support belt or tendering frame of an installation for the continuous production of latex foam sheets, which is commonly used in the industry. A liquid latex foam layer is spread over the base layer. The latex foam mixture can consist of natural latex or synthetic latex, like Intex 2720 or Intex 2731 (commercially available from Polimeri Europa) or any other available foam latex or mixture. The top surface of the latex foam can be profiled in different zones during the curing process of the latex foam. The combined layers follow the entire process on the continuous production installation through the different steps: preheating, vulcanising, washing, pressing, drying. After the drying step, the combined layers can be perforated in a regular pattern with holes of the same diameter or a zoned pattern with pins of different diameter. Finally the product is cut to length and width, and can be produced in sheets or rolls The composite foam of the present invention can be used in numerous other applications. Main sectors of application are cosmetic industry such as pads, automotive and aircraft industry, upholstered furniture and technical articles. For instance, full foam seats, top pads for the seats and restraints for back and head, all made from the beddings of the present invention can be used in cars and aeroplanes. Other applications include the use of carpet backings, foamed seat saddles for motorbikes, gaskets between a car body and its lights, lip seals of air filters for engines and insulating layer on car parts and engine parts to reduce sound and vibration. It will be appreciated that each specific application puts its own demands on the beddings to be used. Important characteristics in this connection are density, hardness, resilience and dampening behaviour of the bedding and in order to fit each application, these characteristics should be optimally balanced and adjusted.

Other suitable applications are those where energy management is required. The bedding is particularly advantageous for use in vehicular applications such as door panels, instrument panel topper pads, air bag doors and the like.

In addition the composite foam of the present invention may further comprise sheets of acrylonitrile-butadiene-styrene, high-impact polystyrene (HIPS), polyethylene terephthalate (PET), polyethylene, polypropylene, ethylene vinyl acetate, polyvinyl acetate (PVA), polyvinyl chloride (PVC), olefins including thermoplastic olefins (TPO) and the like. The composite foam of the present invention may also include natural or synthetic fibers for imparting strength. The foam composite is also preferably shape formable and retainable to conform to the substrate for any particular application. Additionally, the composite foam of the present invention may include organic and/or inorganic fillers. Furthermore, additional additives may be incorporated into bedding of the present invention such as but not limited to flame retardants, anti-fogging agents, ultraviolet absorbers, thermal stabilizers, pigments, colorants, odor control agents, and the like.

In another embodiment of the present invention, customizing the composite foam, for its use as a bedding can be done by a potential user who completes a questionnaire to aid in the analysis of that user's "sleep profile and comfort" profile. The sleep-comfort profile assesses such factors as the user's general health and sleep habits. A firmness recommendation is computed either in terms of a pressure for various zones of a "test mattress" containing an air bladder or in terms of a foam type and density for each zone. In addition, a surface recommendation is established based on the user's responses to a surface recommendation questionnaire and the composite foams of the present invention are then tailored according to the consumer needs.

The invention claimed is:

1. A bedding comprising a single composite foam, the composite foam comprising: a top layer of latex foam and a second layer of an open-celled foam selected from polyolefin, polyurethane, polystyrene or polyester or visco-elastic latex or mixtures thereof, wherein the top layer and the second layer are coextensive to each other and wherein in use, the composite foam is oriented such that the top layer is directed towards the top surface of the bedding and wherein composite foam layer is obtained by spreading and vulcanizing a liquid latex foam layer on the second layer, thereby causing the liquid latex to enter into the open-cells on the surface of the foam of the second layer and vulcanize in said cells, and thus connecting both layers to obtain a single composite foam without applying glue or any other mechanical connection means, and wherein the vulcanized liquid latex layer has a thickness of 0.5 cm to 6 cm on top of the second layer, and wherein the second layer has a lower indentation load deflection value than the top layer.

2. The bedding according to claim 1 wherein the second layer is made from open-celled polyurethane foam.

3. The bedding according to claim 1 having perforations in the top layer which are arranged in a pattern of rows of perforations and/or columns of perforations.

4. The bedding according to claim 1 wherein the foam of the second layer is convoluted foam.

5. The bedding according to claim 1 wherein an upper surface of the top layer is provided with a profile.

6. The bedding according to claim 5 wherein said profile is in the form of a pattern of corrugations.

7. The bedding according to claim 1 further comprising a bottom layer of latex foam.

8. The bedding according to claim 1 wherein said top and second layers are bonded together.

9. A composite foam bedding material which comprises
a first layer of vulcanized latex foam;
a second layer of an open-celled foam joined to the first layer by spreading and vulcanizing a liquid latex foam layer on the second layer, thereby causing the liquid latex to enter into the open-cells on the surface of the foam of the second layer and vulcanize in said cells, and thus connecting both layers to obtain a single composite foam without applying glue or any other mechanical connection means, the second layer comprising a member selected from the group consisting of polyolefin, polystyrene, polyester, viscoelastic latex or mixtures thereof;
the first layer being oriented so that it is facing the top surface of the bedding and
the first layer having a thickness of at least 0.5 cm to 6 cm on top of the second layer,
wherein the top layer and the second layer are coextensive to each other, and wherein the second layer has a lower indentation load deflection value than the top layer.

* * * * *